UNITED STATES PATENT OFFICE.

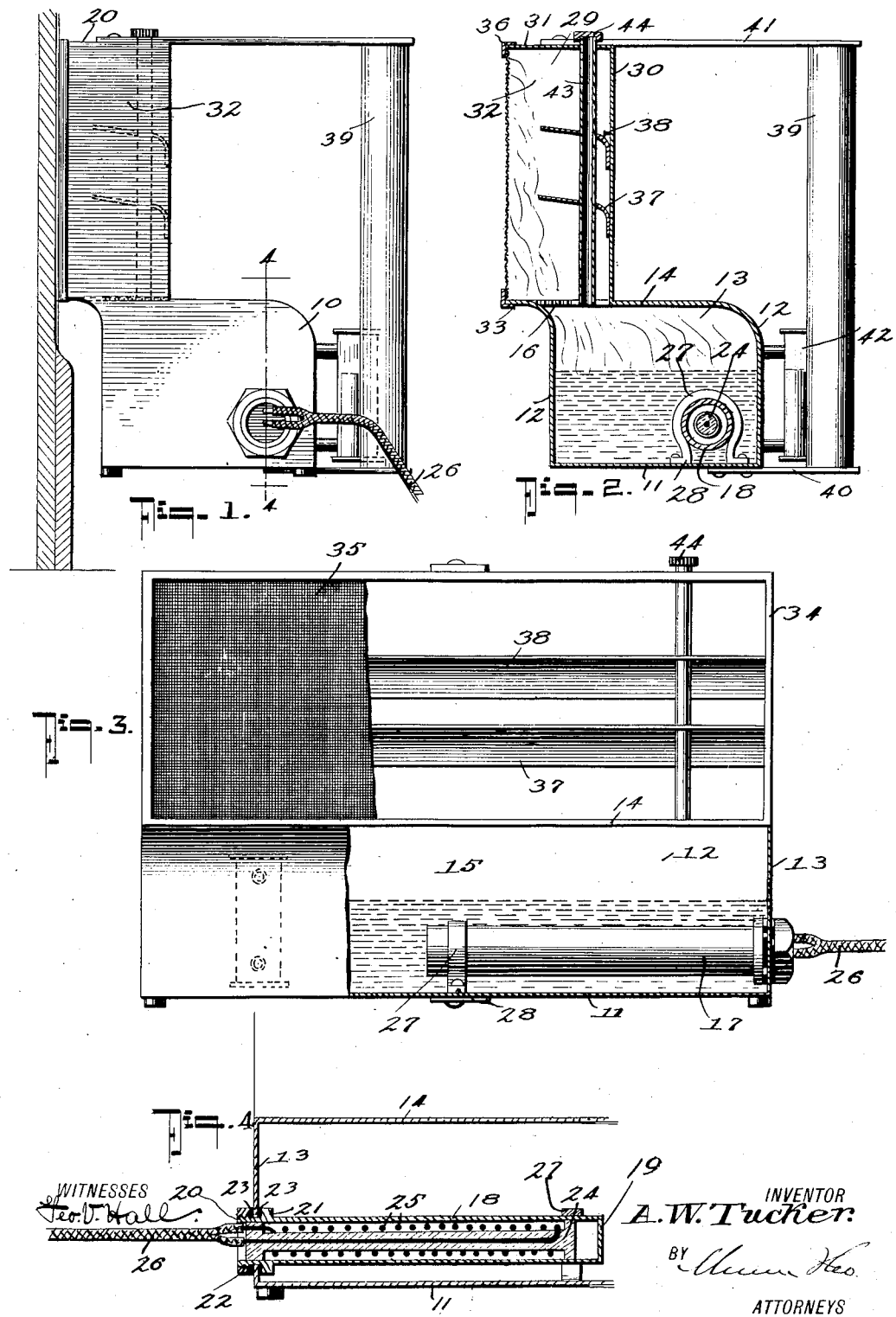

ARTHUR WALLACE TUCKER, OF TULSA, OKLAHOMA, ASSIGNOR OF ONE-HALF TO J. P. RICHE, OF KANSAS CITY, MISSOURI.

STEAM WALL-PAPER REMOVER.

1,391,350.  Specification of Letters Patent.  Patented Sept. 20, 1921.

Application filed October 5, 1920. Serial No. 414,893.

*To all whom it may concern:*

Be it known that I, ARTHUR WALLACE TUCKER, a citizen of the United States, and a resident of Tulsa, in the county of Tulsa and State of Oklahoma, have invented certain new and useful Improvements in Steam Wall-Paper Removers, of which the following is a specification.

This invention relates to a device for removing wall paper from walls or other surfaces to which it has been affixed, and is especially adapted to utilize steam in the accomplishment of its purpose.

The object of the invention is to provide a steam wall paper remover of this character which is self-contained and of simple and unitary construction, which electrically generates its own steam in a manner convenient, cleanly and entirely safe, which efficiently distributes and applies the steam to the wall paper so that the steam permeates, softens and loosens the same to effect the complete removal thereof and which is extremely easy and inexpensive to manufacture and operate.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a side elevational view of the invention in use;

Fig. 2 is a transverse vertical sectional view thereof;

Fig. 3 is a front elevational view, parts being broken away for the sake of illustration; and Fig. 4 is a fragmentary view in longitudinal vertical section on line 4—4 of Fig. 1.

Referring to the drawings the numeral 10 designates generally a tank or reservoir for water. The tank is preferably of light metallic construction having an imperforate bottom wall 11, imperforate side walls 12, imperforate end walls 13 and a substantially imperforate top wall 14. The reservoir is provided with a steam space 15 and the substantially imperforate top wall is provided with a reticulated top portion along one side, as designated at 16, which constitutes a steam outlet from the steam space. Electric heating means is provided for heating the water to boiling point and is designated generally at 17. This electric heating means consists of a tubular casing 18 inserted in the tank 10 so as to be immersed in the water thereof. The inner end of the casing is closed as at 19, and the outer end is threaded, as at 20, and is provided with an annular shoulder 21 adjacent said threaded portion. A nut 22 is threaded on the portion 20 and suitable packing 23 interposed between the annular shoulder 21 and the nut 22 serves to hermetically seal the electric heating means to the casing. A core or supporting member 24 is inserted in the casing 18 and carries a heating coil 25 which is connected to a cable 26 so as to be supplied with electric current. The cable 26 may be attached to any suitable source of current. If desired the outer end of the tubular casing may be supported by a bracket 27 secured, as at 28, to the base of the tank.

A distributer, designated generally at 29, is arranged over the steam outlet 16 in the reservoir. The distributer consists of a rectangular casing having a vertical and imperforate back wall 30, top wall 31 and side walls 32. As shown in the drawings, a portion of the distributer is offset laterally from the reservoir, as designated at 33, and the offset portion is provided with an opening 34. A screen of wire mesh, as indicated at 35, is arranged across and over the opening 34 of the distributer and secured in position by suitable fastening means 36. A series of deflectors is arranged within the distributer to direct the steam toward the screen opening 34. This series of deflectors consists of superposed deflectors 37 and 38 which are arranged to overlie the steam outlet 16, as clearly shown in Fig. 2. As indicated in this figure the steam from the outlet 16 encounters the first deflector 37 and a portion of this steam is directed toward the adjacent area of the steam opening, some of the steam however continues to flow upwardly until it encounters the second or upper deflector of the series which influences it toward the upper area of the screen opening.

A handle 39 of tubular construction has its lower end connected by a piece 40 to the under side of the tank 10 and has its upper end secured by a piece 41 to the top of the distributer 29. The handle 39 serves to facilitate the manipulation of the wall paper remover.

A water gage glass 42 is also provided, and indicates the height of the water in the tank.

A stand pipe 43 extends upwardly from the steam outlet through the distributer casing to the top thereof, the upper end of the stand pipe being normally closed by a cap 44. The stand pipe 43 provides for the ready and easy replenishing of the water in the reservoir 10.

In the use of the wall paper remover, the cable 26 having been connected to a suitable source of current supply such as for instance the ordinary electrical light socket, the electric heater rapidly heats the water to boiling point and generates steam in the steam space 15. The steam freely flows through the outlet 16 to the distributer and from the distributer is directed by the series of deflectors to the screen opening thereof which further distributes it throughout the openings of the casing. The operator at this time supports and manipulates the apparatus by the handle 39, applying the opening of the distributer casing directly to the paper to be removed, as shown in Fig. 1. The distributer being offset laterally from the tank or reservoir permits the application of the steam to ordinarily inaccessible places. The apparatus is effective to completely and quickly remove the paper from the wall as the steam is applied to the paper in such manner as to quickly permeate, soften and loosen the same. It is entirely clean and agreeable and safe in its operation as the generation of steam is not accompanied by any disagreeable odors of combustion and the steam generated does not more than slightly exceed, if it exceeds at all, atmospheric pressure, and as it can only flow to the opening of the distributer where it is applied directly to the paper. Again the device being self contained and of unitary construction it does not require a source of steam supply nor an expensive and cumbersome apparatus.

I claim:

1. In a steam wall paper remover of the character described, a reservoir for water having a steam space and having a reticulated portion in its top wall constituting a steam outlet, electric heating means immersed in the water of the reservoir, a distributer arranged over the steam outlet consisting of a casing having a portion offset laterally from the reservoir, said offset portion having an opening, a distributing screen of wire mesh covering said opening, a series of deflectors overlying the steam outlet and directing the steam toward the screened opening of the distributer, and a handle connected to said reservoir and to said distributer.

2. In a steam wall paper remover of the character described, a reservoir for water having a steam space and having a reticulated portion in its top wall constituting a steam outlet, electric heating means immersed in water of the reservoir, a distributer arranged over the steam outlet consisting of a casing having a portion offset laterally from the reservoir, said offset portion having an opening, a distributing screen of wire mesh covering said opening, and a series of deflectors overlying the steam outlet and directing the steam toward the screened opening of the distributer.

3. In a steam wall paper remover of the character described, a reservoir for water having a steam space, said reservoir having a reticulated portion constituting a steam outlet, electric heating means immersed in the water of the reservoir including a casing and a coil arranged in said casing, a distributer arranged over the steam outlet consisting of a casing having an opening, a screen of wire mesh covering said opening, and a series of baffles overlying the steam outlet and directing the steam toward the opening of the distributer.

4. In a steam wall paper remover of the character described, a reservoir for water having a steam space and a steam outlet, electric heating means immersed in the water of the reservoir, a distributer arranged over the steam outlet of the reservoir and having an offset portion provided with an opening, a distributer screen of wire mesh covering said opening, and a series of deflectors directing the steam toward the screened opening of the distributer.

5. In a steam wall paper remover of the character described, a reservoir for water having a steam space and a steam outlet, a distributer arranged over the steam outlet of the reservoir and having an opening, a distributer screen of wire mesh covering said opening, and a series of deflectors directing the steam toward the screened opening of the distributer.

6. In a steam wall paper remover of the character described, a reservoir for water having a steam space and a steam outlet, electric heating means immersed in the water of the reservoir and including a tubular casing having its end within the casing closed and its end without the casing open, means for securing and packing the casing in position in the reservoir and an electric heating element inserted in the open end of the tubular casing, and a distributer arranged over the steam outlet.

ARTHUR WALLACE TUCKER.